(12) United States Patent
Baccouche et al.

(10) Patent No.: US 11,121,780 B2
(45) Date of Patent: Sep. 14, 2021

(54) SYSTEM AND METHOD FOR CALIBRATING A MULTI-CHANNEL RADIO FREQUENCY SIGNAL GENERATION SYSTEM

(71) Applicant: Rohde & Schwarz GmbH & Co. KG, Munich (DE)

(72) Inventors: Bessern Baccouche, Munich (DE); Rachid El-Assir, Munich (DE); Angel Teofilov, Munich (DE); Michael Koenig, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/126,428

(22) Filed: Dec. 18, 2020

(65) Prior Publication Data

US 2021/0234620 A1    Jul. 29, 2021

(30) Foreign Application Priority Data

Jan. 28, 2020   (EP) .................................... 20154124

(51) Int. Cl.
*H04B 17/12*   (2015.01)
*H04B 17/00*   (2015.01)
(Continued)

(52) U.S. Cl.
CPC ....... *H04B 17/0085* (2013.01); *H04B 7/0413* (2013.01); *H04B 17/12* (2015.01); *H04B 17/14* (2015.01)

(58) Field of Classification Search
CPC .. H04B 17/12; H04B 7/0413; H04B 17/0085; H04B 17/11; H04B 17/21; H04B 17/101;
(Continued)

(56) References Cited

U.S. PATENT DOCUMENTS

2016/0337052 A1* 11/2016 Wen ................... H04B 10/2575

FOREIGN PATENT DOCUMENTS

| EP | 1102418 A1 | 5/2001 |
|---|---|---|
| SE | 535114 C2 | 4/2012 |

OTHER PUBLICATIONS

Reveyrand, T., et al., "Automatic vector signal generator calibration method suitable for multipart large-signal measurements", 93rd ARFTG Microwave Measurement Conference: IEEE, 2019, 4 pages.

* cited by examiner

*Primary Examiner* — Rahel Guarino
(74) *Attorney, Agent, or Firm* — Christensen O'Connor Johnson Kindness PLLC

(57) ABSTRACT

A system for calibrating a multi-channel radio frequency signal generation system is described. At least two signal sources and a calibration unit are provided. A calibration data module is provided that is assigned to at least one of the signal sources. The at least two signal sources are assigned to at least two signal channels. In a first operation mode, the calibration unit is connected with the at least two signal channels simultaneously. The calibration unit is configured to gather calibration data assigned to the at least two signal channels. The system is configured to transfer the calibration data gathered from the calibration unit to the calibration data module. In a second operation mode, the system is configured to disconnect the at least two signal channels from the calibration unit and to connect the at least two signal channels with a device under test. Further, a method of calibrating a multi-channel radio signal generation frequency system is described.

17 Claims, 1 Drawing Sheet

(51) Int. Cl.
*H04B 7/0413* (2017.01)
*H04B 17/14* (2015.01)
(58) Field of Classification Search
CPC ...... H04B 17/15; H04W 24/06; H04W 88/06; H04W 72/0453
See application file for complete search history.

SYSTEM AND METHOD FOR CALIBRATING A MULTI-CHANNEL RADIO FREQUENCY SIGNAL GENERATION SYSTEM

TECHNICAL FIELD

Embodiments of the present disclosure relate to a system for calibrating a multi-channel radio frequency signal generation system. Further, embodiments of the present disclosure relate to a method of calibrating a multi-channel radio frequency signal generation system.

BACKGROUND

In the state of the art, it is known to test a device under test by using a radio frequency signal generation system that is configured to generate a radio frequency signal forwarded to the device under test for testing purposes. Modern communication devices relate to multiple input multiple output (MIMO) communication devices that have to be tested by means of the radio frequency signal generation system with respect to their different channels provided. Therefore, modern radio frequency signal generation systems correspond to multi-channel radio frequency signal generation systems that have several signal channels that can be connected with the device under test for testing purposes, particularly the MIMO characteristics of the device under test.

Prior to the testing the device under test, the signal generation system itself has to be calibrated in order to ensure accurate measurement of the device under test. Typically, the calibration of the radio frequency generation system is done manually or semi-automatically, as the respective systems are very specific such that a repetition of a calibration process performed is not feasible. Moreover, the specific radio frequency generation systems do not allow to scale a calibration process performed in an appropriate manner. Thus, calibration data and/or correction data are gathered manually or semi-automatically during a calibration, which have to be retrieved or rather entered during the testing of the device under test. This however results in high efforts when testing a device under test.

Accordingly, there is need for a simple and cost-efficient way to calibrate a multi-channel radio frequency signal generation system in order to enable the radio frequency signal generation system to perform measurements on a device under test in an efficient manner.

SUMMARY

Embodiments of the present disclosure provide a system for calibrating a multi-channel radio frequency signal generation system. In an embodiment, the system includes at least two signal sources and a calibration circuit or unit. Further, a calibration data circuit or module is provided that is assigned to at least one of the signal sources. The at least two signal sources are assigned to at least two signal channels. In a first operation mode, the calibration unit is connected with the at least two signal channels simultaneously. The calibration unit is configured to gather calibration data assigned to the at least two signal channels. The system is configured to transfer the calibration data gathered from the calibration unit to the calibration data module. In a second operation mode, the system is configured to disconnect the at least two signal channels from the calibration unit and to connect the at least two signal channels with a device under test.

Further, embodiments of the present disclosure provide a method of calibrating a multi-channel radio frequency signal generation system. In an embodiment, the method comprises the following steps:

generating at least two signals by at least two signal sources;

forwarding the signals via at least two signal channels, respectively;

receiving the signals by a calibration unit simultaneously;

gathering calibration data by the calibration circuit or unit;

transferring the calibration data gathered from the calibration unit to a calibration data module that is assigned to at least of one of the signal sources;

applying the calibration data gathered; and disconnecting the at least two signal channels from the calibration unit and connecting the at least two signal channels with a device under test.

Accordingly, the entire system comprises a calibration unit that is connected with the multi-channel radio frequency generation system such that calibration data can be gathered directly and automatically. The calibration data gathered by the calibration unit is transferred to the calibration data module directly, which is assigned to the signal sources. Hence, the calibration data can be applied in order to calibrate the multi-channel radio frequency signal generation system, namely to configure or rather to set up the multi-channel radio frequency signal generation system in an appropriate manner. In some embodiments, the multi-channel radio frequency signal generation system comprises the at least two signal sources as well as the calibration data module that is assigned to at least one of the signal sources.

In other words, the entire multi-channel radio frequency signal generation system is abstracted to the level of the signal channels, for example by the calibration unit or rather software means (e.g., executable instructions, program code, scripts, etc.) associated with the calibration unit. The calibration unit may define or rather emulate at least one test instrument that corresponds to the device under test to be tested later, ensuring proper calibration of the multi-channel radio frequency signal generation system. Thus, the quantities to be calibrated, also called calibration parameters, are provided by the calibration unit in order to ensure proper calibration of the multi-channel radio frequency signal generation system with respect to the device under test.

For instance, a network analyzer, a power sensor, a spectrum analyzer and/or an oscilloscope are/is emulated by the calibration unit. Thus, the device under test, which is to be tested later by the calibrated multi-channel radio frequency signal generation system, may relate to a network analyzer, a power sensor, a spectrum analyzer and/or an oscilloscope.

In general, the first operation mode of the system corresponds to a calibration mode, in which the calibration data is gathered that is used to calibrate the multi-channel radio frequency signal generation system. Once the respective calibration data has been gathered by the calibration unit, the calibration data is transferred to the calibration data module. The calibration data module applies the respective calibration data on the multi-channel radio signal generation frequency system, for example on at least one of the signal sources, in order to calibrate and/or configure the multi-channel radio frequency signal generation system.

The second operation mode of the multi-channel radio frequency signal generation system corresponds to a measurement mode. In the second operation mode, the signal channels of the multi-channel radio frequency signal generation system are connected with the device under test such that the signals generated by the at least two signal sources are forwarded to the device under test via the signal channels. Since the calibration data has been applied on the multi-channel radio frequency signal generation system previously, it is ensured that the multi-channel radio frequency signal generation system is calibrated in an appropriate manner, ensuring accurate measurements of the device under test in the second operation mode.

Generally, the number of signal sources as well as the number of signal channels may differ from each other. Put differently, the number of signal sources as well as the number of signal channels may be different. For instance, each of the signal sources may be assigned to at least two signal channels, yielding twice as much signal channels with regard to the number of signal sources.

An aspect provides, that the system comprises a switch matrix assigned to at least two signal channels. In some embodiments, the switch matrix is configured to switch the at least two signal channels from the calibration unit to the device under test automatically. The switch matrix may be part of the multi-channel radio frequency signal generation system. Thus, the switch matrix is disposed between the signal sources and the calibration unit and/or the device under test. The switch matrix may comprise at least two different kinds of output ports that are assigned to the device under test and the calibration unit, respectively. Further, the switch matrix has inputs that are assigned to the at least two signal sources. Accordingly, the switch matrix processes the signals received by the at least two signal sources while forwarding the signals to the calibration unit or the device under test depending on the respective operation mode. Hence, the switch matrix may correspond to at least a portion of the signal channels.

As the switch matrix can switch between the calibration unit and the device under test automatically, fully automatic testing of the device under test can be ensured. Therefore, a user or rather an operator of the system is not required to (re-)establish the respective connections between the multi-channel radio frequency generation system and the calibration unit and/or the device under test. In some embodiments, the device under test is automatically connected with the multi-channel radio frequency generation system after the radio frequency generation system has been calibrated appropriately. This is ensured by the switch matrix that is interconnected between the signal sources and the calibration unit as well as the device under test.

For instance, the switch matrix is configured to be controlled by a test sequence executed, the calibration unit and/or at least one of the signal sources. Thus, a fully automatic control of the switch matrix is ensured.

The test sequence may be executed by a control and/or evaluation circuit or unit that is assigned to the system. The control and/or evaluation unit may also control the signal sources. For instance, the control and/or evaluation unit may be connected with each of the components of the system in order to control the respective components (individually). Moreover, the control and/or evaluation unit may also receive information or parameters of the respective components for evaluation purposes. In some embodiments, the control and/or evaluation unit may abstract the multi-channel radio frequency signal generation system to the level of the signal channels.

The calibration data gathered may be transferred manually and/or automatically from the calibration unit to the calibration data module. Thus, a manual data transfer may be used in order to transfer the calibration data from the calibration unit to the calibration data module. However, the data transfer may also be provided in an automatic manner such that the calibration unit communicates with the calibration data module in order to forward the calibration data automatically. Furthermore, the calibration data gathered may be transferred both manually and automatically. For instance, a portion of the calibration data gathered is transferred automatically, whereas another portion of the calibration data gathered is transferred manually.

Thus, a communication circuit or module may be provided that is configured to transfer the calibration data gathered (automatically). The communication module is connected with the calibration unit and the calibration data module. The respective communication module may comprise at least two portions that are assigned to the calibration unit and the calibration data module, respectively. The respective portions of the communication module communicate with each other.

In some embodiments, the communication module is configured to establish a communication link between the calibration unit and the calibration data module, wherein the calibration data gathered can be transferred easily via that communication link.

For instance, the calibration data module is incorporated in at least one of the signal sources. The signal sources may be interconnected with each other such that the calibration data received can be transferred among the signal sources.

In some embodiments, each of the signal sources encompasses a respective calibration data module. Thus, each of the signal sources has its own calibration data module that may communicate with the calibration unit by its own. Thus, a redundancy is provided in case of failure of one of the calibration data modules or the respective communication link.

Another aspect provides that the calibration unit comprises a coherent receiver. The coherent receiver may receive signals via the at least two signal channels simultaneously. Further, the coherent receiver may be aware of the type of signals to be received, for example with respect to their timings.

According to another aspect, the calibration data is measured by a measurement circuit or module of the calibration unit. Thus, the calibration unit comprises the measurement module that is configured to perform respective measurements on the signals received via the signal channels in the first operation mode. In some embodiments, the measurement module measures data that corresponds to the calibration data. Thus, the calibration data is directly measured.

Furthermore, the calibration data may be calculated by a calculation circuit or module of the calibration unit. Hence, the calibration unit comprises the calculation module. The calibration unit may comprise the calculation module as well as the measurement module. Thus, an interpolation and/or an extrapolation may be performed on the measurement results obtained from the measurement module, wherein the interpolation and/or the extrapolation may be performed by the calculation unit.

In general, the calibration unit, for example the measurement module and/or the calculation module, is configured to generate calibration data and/or correction data.

For instance, the calibration unit, for example the measurement module and/or the calculation module, is configured to generate calibration data for frequency, level and/or modulation bandwidth.

Further, the calibration unit, for example the measurement module and/or the calculation module, may be configured to generate correction data for correction of modulation bandwidth and/or for correction of group delay. Thus, group delay may also be corrected by the calibration unit. The respective calibration data and/or correction data is forwarded to the calibration data module such that the respective data is applied on the signal sources, yielding the calibrated multi-channel radio frequency signal radio generation system.

Furthermore, one of the several signal sources may correspond to a reference source. Thus, a reference channel or rather reference signal channel is provided. Accordingly, one of the signal sources is used as the reference source in the first operation mode, namely the calibration mode.

In general, the entire testing of the device under test is facilitated since the testing is automated. In some embodiments, the user or operator does not have to establish the respective connections manually, to setup the components for testing, to store the calibration data manually and to load the calibration data manually.

Generally, the signal channels may be assigned to virtual instrument software architecture (VISA) strings for establishing a communication with the respective physical components of the system.

During the calibration mode, at least several, for example all possible, combinations of level and frequency are determined. In other words, the calibration and/or correction data gathered is assigned to several combinations of level and frequency, for example all possible ones.

Therefore, the data gathered corresponds to a reference dataset, for instance a reference matrix having matrix entries with a respective calibration/correction value.

During the measurement mode, the respective dataset is taken into consideration, for example the matrix entry assigned to the respective pair of frequency and level used for testing the device under test. The matrix entry, namely its calibration/correction value, is loaded and applied.

However, it is also possible that the user may adapt the calibration/correction value manually, for instance to overwrite the respective value.

If the dataset gathered does not comprise a calibration/correction value for the respective pair of frequency and level intended for testing the device under test, the calibration/correction value of the next pair of frequency and level calibrated is used (nearest neighbor).

Any deviations, for example level deviation and/or frequency deviation, that may occur with respect to the intended frequency and/or level are compensated by means of a frequency offset, attenuation and/or amplification such that the intended level and frequency are obtained. The attenuation and/or amplification may take place in the digital domain.

In some embodiments, the compensation is done automatically when selecting a certain level and/or frequency for testing the device under test.

For instance, the compensation is implemented by means of an In-phase and Quadrature (IQ) delay, a numerically controlled oscillator (NCO) phase offset and/or digital amplification.

Moreover, an equalizer may be provided in order to compensate any non-linearities.

The calibration and/or correction data gathered by the calibration unit is used as feedback for the multi-channel radio frequency signal generation system, for example the signal sources, during the respective calibration.

The data forwarded to the calibration data module encompass data regarding group delay and modulation bandwidth such that any issues with group delay and modulation bandwidth can be compensated or rather corrected when applying the respective data.

In addition, the switch matrix generally ensures that the signal paths originating from the signal sources can be connected with the calibration unit and the device under test in an alternate manner, for example depending on the operation mode.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In some embodiments described below, the term "module" or "unit" refers to, inter alia, a combination of hardware (e.g. a processor such as an integrated circuit or other circuitry) and software (e.g. machine- or processor-executable instructions, commands, or code such as firmware, programming, or object code). Furthermore, a combination of hardware and software may include hardware only (i.e. a hardware element with no software elements), software hosted at hardware (e.g. software that is stored at a memory and executed or interpreted at a processor), or hardware with the software hosted thereon. In some embodiments, the hardware may, inter alia, comprise a CPU, a GPU, an FPGA, an ASIC, or other types of electronic circuitry.

Figure 1:
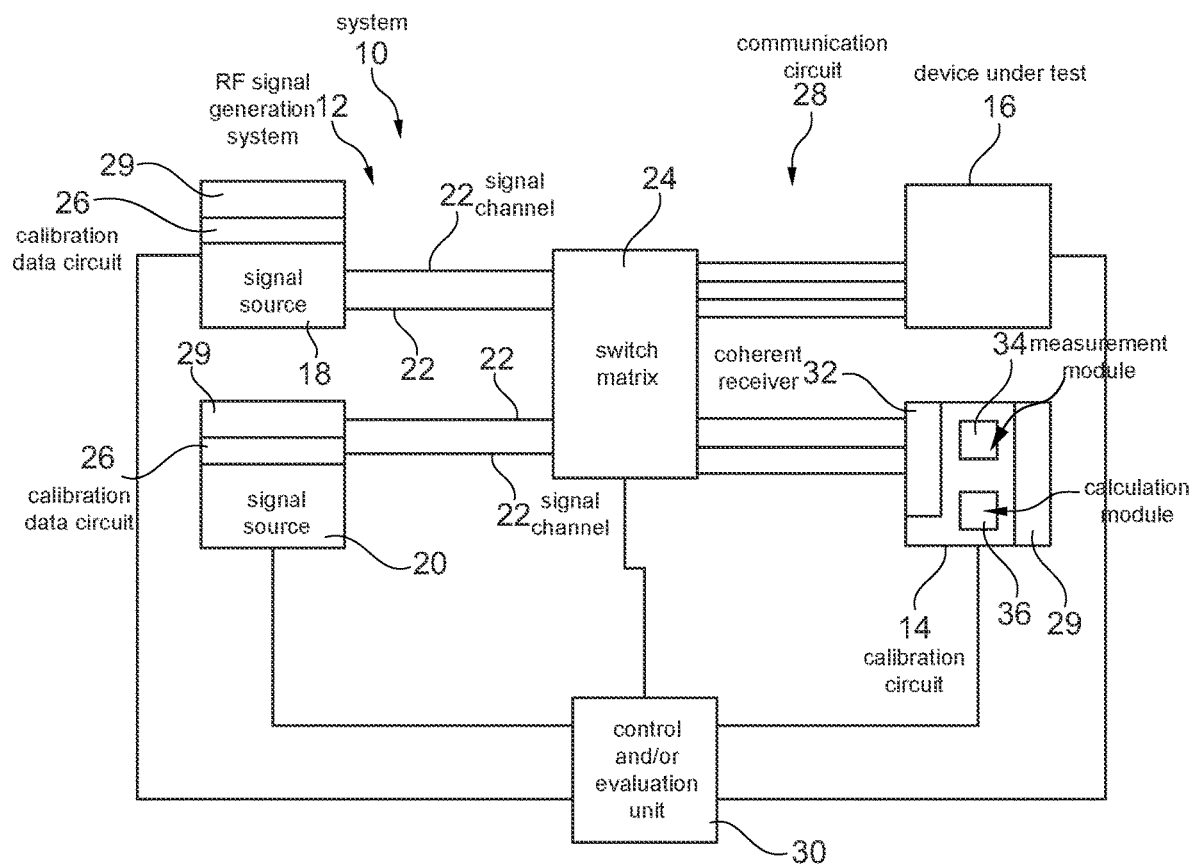
FIG. 1 schematically shows a representative embodiment of a system according to the present disclosure.
Figure 2:
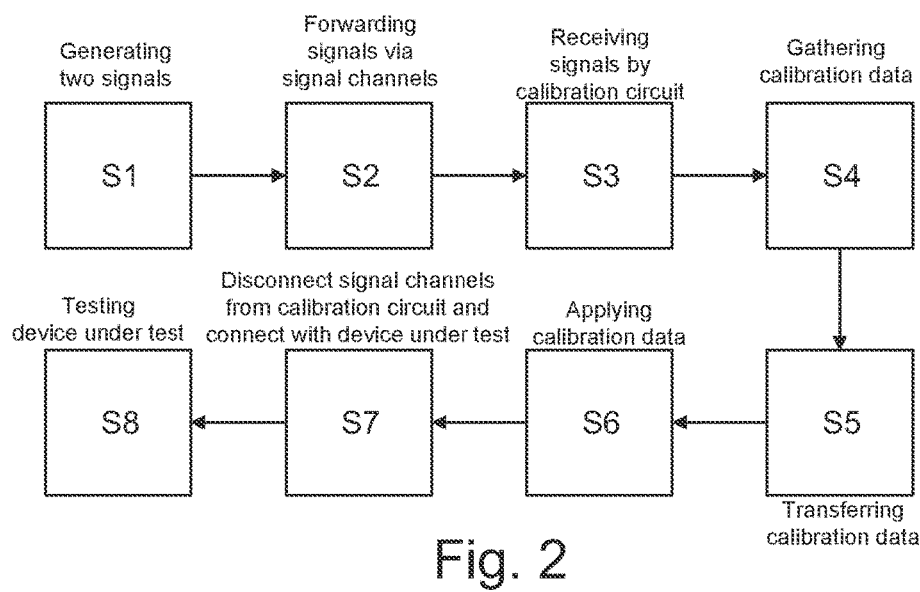
FIG. 2 shows a flow-chart of a representative method of calibrating a multi-channel radio frequency signal generation system.

In FIG. 1, a system 10 is shown that comprises a multi-channel radio frequency signal generation system 12 that can be calibrated by the system 10 as will be described hereinafter. The system 10 comprises a calibration circuit or unit 14 as well as a device under test 16 which both are assigned to the multi-channel radio frequency signal generation system 12.

In the shown embodiment, the radio frequency signal generation system 12 has two signal sources 18, 20 that each have two signal channels 22. Thus, the multi-channel radio frequency signal generation system 12 comprises four signal channels 22 in total. Further, the radio frequency signal generation system 12 has a switch matrix 24 that is assigned to the signal channels 22. The switch matrix 24 is located between the signal sources 18, 20 and the calibration unit 14 as well as the device under test 16 as illustrated in FIG. 1. In other words, the switch matrix 24 is interconnected between the signal sources 18, 20 and the calibration unit 14 as well as the device under test 16. Moreover, the multi-channel radio frequency signal generation system 12 has at least one calibration data circuit or module 26 that is assigned to at least one of the signal sources 18, 20.

In the shown embodiment, each of the signal sources 18, 20 has its own calibration data module 26. Alternatively, one single calibration data module 26 is provided that is assigned to one of the signal sources 18, 20, wherein the signal sources 18, 20 are configured to communicate with each other.

Further, the system 10 has a communication circuit or module 28 via which a communication link is established between the calibration unit 14 and the calibration data module 26. Thus, data can be transferred between the calibration unit 14 and the calibration data module 26 via the communication link established directly.

For instance, the communication module 28 may comprise several portions 29 that are associated with the respective components, namely the calibration unit 14 and the calibration data module 26, in order to establish the communication link for data exchange. In general, the communication module 28, for example its several portions 29, is configured to provide a wireless communication link or a wired communication link among the respective components of the system 10.

Furthermore, a control and/or evaluation circuit or unit 30 may be provided that is assigned to the system 10, for example the signal sources 18, 20, the calibration unit 14 as well as the device under test 16. In some embodiments, the control and/or evaluation unit 30 may control the respective components of the system 10 in order to perform a calibration process and/or a testing of the device under test 16.

In some embodiments, the control and/or evaluation unit 30 also comprises a portion of the communication module 28. In other words, the communication module 28 is also associated with the control and/or evaluation unit 30.

In a first operation mode of the system 10, which corresponds to a calibration mode, the switch matrix 24 is controlled such that a signal path is established between the multi-channel radio frequency signal generation system 12 and the calibration unit 14. In some embodiments, at least two of the signal channels 22, for example all of them, are connected with the calibration unit 14 simultaneously by the switch matrix 24. Thus, signals generated by the signal sources 18, 20 are forwarded via the signal channels 22 and the switch matrix 24 to the calibration unit 14.

The calibration unit 14 may comprise a coherent receiver 32 such that different signals received via the plurality of signal channels 22 can be processed simultaneously by the calibration unit 14 in an appropriate manner.

In the shown embodiment, the calibration unit 14 has a measurement circuit or module 34 that is configured to perform measurements on the signals received, yielding measurement values. These measurement values may be used for calibration of the multi-channel radio frequency signal generation system 12. Hence, the measurement values relate to calibration data.

Furthermore, the calibration unit 14 may comprise a calculation circuit or module 36 that is configured to perform calculations on the signals received and/or the measurement results obtained by the measurement module 34.

In general, the calibration unit 14 gathers calibration data assigned to the signal channels 22 by the measurement module 34 and/or the calculation module 36. Besides the calibration data, the calibration unit 14 may also gather correction data for compensating certain effects. Generally, the respective data gathered may relate to calibration/correction data for frequency, level and/or modulation bandwidth. Furthermore, the correction data may concern correction of modulation bandwidth and/or group delay.

The respective data gathered may be transferred from the calibration unit 14 to the calibration data module 26 such that the data received can be applied in order to calibrate/configure the multi-channel radio frequency signal generation system 12 appropriately for testing the device under test 16 in a subsequent step. The data may be transferred manually and/or automatically by the communication module 28.

For instance, the calibration data module 26 is incorporated in at least one of the signal sources 18, 20 such that at least one of the signal sources 18, 20 can process the data received directly.

The signal sources 18, 20 may be interconnected with each other, ensuring to exchange the respective data among each other. Alternatively, each of the signal sources 18, 20 may encompass its own calibration data module 26 that may have a communication link with the calibration unit 14 for receiving the respective data.

In some embodiments, one of the signal sources 18, 20 is used as a reference source during the first operation mode such that at least one of the signal channels 22 corresponds to a reference channel to which the other signal channels 22 are referred to.

In the second operation mode, namely after applying the respective data in order to calibrate the multi-channel radio frequency signal generation system 12, the switch matrix 24 may be controlled to switch from the calibration unit 14 to the device under test 16 automatically. In other words, the signal channels 22 are disconnected from the calibration unit 14 and connected with the device under test 16.

Hence, the signal sources 18, 20 are connected with the device under test 16 via the signal channels 22 and the switch matrix 24.

Then, the device under test 16 can be tested by the already calibrated multi-channel radio frequency generation system 12 without the need of establishing the respective connections with the device under test 16 manually. This can be simplified as the respective switch matrix 24 ensures to automatically establish the connections with the device under test 16. In some embodiments, the signals from the signal sources 18, 20 are directed to the device under test 16 via the switch matrix 24.

The switch matrix 24 may be controlled by a test sequence executed, for instance on the control and/or evaluation unit 30. Alternatively or additionally, the switch matrix 24 is controlled by the calibration unit 14 itself and/or at least one of the signals sources 18, 20.

For instance, the switch matrix 24 is controlled by the calibration unit 14 after the calibration and/or correction data has been forwarded to the calibration data module 26, as the data transfer corresponds to the final step of the first operation mode, namely the calibration mode. Alternatively, the switch matrix 24 is controlled by one of the signals sources 18, 20 after correct receipt of the calibration and/or correction data from the calibration unit 14. Put differently, the respective signal source 18, 20 outputs an acknowledgement signal indicating safe receipt of the calibration and/or correction data, which in turn means that the first operation mode has been completed successfully.

In general, the system 10 is configured to perform the method of calibrating the multi-channel radio signal generation frequency system 12.

In a first step S1, at least two signals are generated by at least two signal sources 18, 20. The respective signal sources 18, 20 may be controlled by the control and/or evaluation unit 30 accordingly.

In a second step S2, the signals generated are forwarded via at least two of the signal channels 22, respectively.

In a third step S3, the signals are received by the calibration unit 14 simultaneously, namely by the coherent receiver 32. The calibration unit 14 analyzes the respective signals received, for instance by performing measurements on the signals by the measurement module 34 and/or calculations by the calculation module 36, for instance interpolations and/or extrapolations.

In a fourth step S4, calibration data is gathered by the calibration unit 14. The calibration data is associated with the results of the analysis. Besides the calibration data, correction data may also be gathered such that calibration and/or correction data is gathered.

In a fifth step S5, the calibration (and/or correction) data gathered is transferred from the calibration unit 14 to the calibration data module 26 that is assigned to at least one of the signal sources 18, 20. For instance, the data is transferred via the communication module 28, for example the portions 29 of the communication module 28 communicating with each other.

In a sixth step S6, the calibration (and/or correction) data gathered is applied on at least one of the signal sources 18, 20 in order to calibrate or rather configure the multi-channel radio signal generation frequency system 12.

In a seventh step S7, the at least two signal channels 22 are disconnected from the calibration unit 14 and connected with the device under test 16. In some embodiments, the switch matrix 24 is controlled to establish the respective signal paths. In other words, the system 10 is transferred from its first operation mode, namely the calibration mode, into its second operation mode, namely the measurement mode.

The switch matrix 24 may be controlled in an automatic manner without any manual input. For instance, the switch matrix 24 receives a control signal from the control and/or evaluation unit 30 executing a test sequence. Alternatively, another component of the system 10 may control the switch matrix 24 appropriately. For instance, the calibration unit 14 and/or at least one of the signal sources 18, 20 may forward a respective control signal to the switch matrix 24.

In an eighth step S8, the device under test 16 is tested by the calibrated multi-channel radio signal generation frequency system 12.

Accordingly, at least several, for example all possible, combinations of level and frequency are determined in the calibration mode when gathering the calibration and/or correction data. The data, namely the calibration and/or correction data, corresponds to a reference dataset, for instance a reference matrix having matrix entries with a respective calibration/correction value.

During the measurement mode, namely subsequent to the calibration mode, the respective dataset is taken into consideration, for example the matrix entry assigned to a respective pair of frequency and level intended for testing the device under test 16. The matrix entry, namely its calibration/correction value, is loaded and applied so as to setup the multi-channel radio signal generation frequency system 12 appropriately, for example in a calibrated manner. However, it is also possible that the user may adapt the calibration/correction value manually, for instance to overwrite the respective value. This can be done via the control and/or evaluation unit 30.

If the dataset does not comprise a calibration/correction value for the respective pair of frequency and level intended for testing the device under test 16, the calibration/correction value of the next pair of frequency and level calibrated is used (nearest neighbor).

Any deviations, for example level deviation and/or frequency deviation, that may occur with respect to the intended frequency and/or intended level are compensated by a frequency offset, attenuation and/or amplification such that the intended level and frequency are obtained. The attenuation and/or amplification may take place in the digital domain of the multi-channel radio signal generation frequency system 12.

In some embodiments, the compensation is done automatically when selecting a certain level and/or frequency for testing the device under test 16.

For instance, the compensation is implemented by an In-phase and Quadrature (IQ) delay, a numerically controlled oscillator (NCO) phase offset and/or digital amplification. Moreover, an equalizer may be provided in order to compensate any non-linearities.

Accordingly, a system 10 is provided that ensures automatic calibration of a multi-channel radio frequency signal generation system 12 as well as subsequent automatic testing of the device on test 16 connected with a multi-channel radio frequency signal generation system 12. Hence, the efforts for the operator of the system 10 are reduced significantly.

Certain embodiments disclosed herein, for example one or more of the respective module(s), unit(s), etc., utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A system for calibrating a multi-channel radio frequency signal generation system, comprising:
    at least two signal sources;
    a calibration circuit;
    a calibration data circuit assigned to at least one of the signal sources, wherein the at least two signal sources are assigned to at least two signal channels,
    wherein the calibration circuit, in a first operation mode, is connected with the at least two signal channels simultaneously, wherein the calibration circuit is configured to gather calibration data assigned to the at least two signal channels,
    wherein the system is configured to transfer the calibration data gathered from the calibration circuit to the calibration data circuit, and wherein, in a second operation mode, the system is configured to disconnect the at least two signal channels from the calibration circuit and to connect the at least two signal channels with a device under test.

2. The system according to claim 1, further comprising a switch matrix assigned to the at least two signal channels.

3. The system according to claim 2, wherein the switch matrix is configured to switch the at least two signal channels from the calibration circuit to the device under test automatically.

4. The system according to claim 2, wherein the switch matrix is configured to be controlled by at least one of a test sequence executed, the calibration circuit or at least one of the signal sources.

5. The system according to claim 1, wherein the calibration data gathered is transferred manually and/or automatically from the calibration circuit to the calibration data circuit.

6. The system according to claim 1, wherein a communication circuit is provided that is configured to transfer the calibration data gathered, wherein the communication circuit is connected with the calibration circuit and the calibration data circuit.

7. The system according to claim 1, wherein the calibration data circuit is incorporated in at least one of the signal sources.

8. The system according to claim 7, wherein each of the signal sources encompasses a respective calibration data circuit.

9. The system according to claim 1, wherein the calibration circuit comprises a coherent receiver.

10. The system according to claim 1, wherein the calibration data is measured by a measurement circuit of the calibration circuit.

11. The system according to claim 1, wherein the calibration data is calculated by a calibrating circuit of the calibration circuit.

12. The system according to claim 1, wherein the calibration circuit is configured to generate calibration data for at least one of frequency, level or modulation bandwidth.

13. The system according to claim 1, wherein the calibration circuit is configured to generate correction data for correction of at least one of modulation bandwidth or group delay.

14. The system according to claim 1, wherein one of the signal sources corresponds to a reference source.

15. A method of calibrating a multi-channel radio signal generation frequency system comprising:
    generating at least two signals by at least two signal sources;
    forwarding the signals via at least two signal channels, respectively;
    receiving the signals by a calibration circuit simultaneously;
    gathering calibration data by the calibration circuit;
    transferring the calibration data gathered from the calibration circuit to a calibration data circuit that is assigned to at least one of the signal sources;
    applying the calibration data gathered; and
    disconnecting the at least two signal channels from the calibration circuit and connecting the at least two signal channels with a device under test.

16. The method according to claim 15, wherein the calibration data gathered comprises calibration data for at least one of frequency, level or modulation bandwidth.

17. The method according to claim 15, wherein correction data is gathered by the calibration circuit, and wherein the correction data generated comprises correction data for correction of at least one of modulation bandwidth or group delay.

* * * * *

UNITED STATES PATENT AND TRADEMARK OFFICE
CERTIFICATE OF CORRECTION

PATENT NO. : 11,121,780 B2
APPLICATION NO. : 17/126428
DATED : September 14, 2021
INVENTOR(S) : B. Baccouche et al.

It is certified that error appears in the above-identified patent and that said Letters Patent is hereby corrected as shown below:

On the Title Page

Item (72)  Line 1  change "Bessern Baccouche" to
-- Bessem Baccouche --

Signed and Sealed this
Eleventh Day of October, 2022

Katherine Kelly Vidal
*Director of the United States Patent and Trademark Office*